United States Patent [19]

Skier

[11] Patent Number: 5,842,309
[45] Date of Patent: Dec. 1, 1998

[54] BIO-DEGRADABLE PLANT ROOT WATERING SYSTEM

[76] Inventor: Merrill Skier, 2229 Clanfield, Acton, Calif. 93510

[21] Appl. No.: 871,256

[22] Filed: Jun. 9, 1997

[51] Int. Cl.⁶ .................................................. A01G 29/00
[52] U.S. Cl. ............................................................. 47/48.5
[58] Field of Search ...................................... 47/48.5, 1.01

[56] References Cited

U.S. PATENT DOCUMENTS

| | | | |
|---|---|---|---|
| 1,401,386 | 12/1921 | Woodberry | 47/48.5 |
| 2,685,761 | 8/1954 | Schlesser | 47/48.5 |
| 3,151,415 | 10/1964 | James | 47/48.5 |
| 3,438,575 | 4/1969 | Rohling | 47/48.5 |
| 5,030,031 | 7/1991 | Brown | 47/48.5 |
| 5,252,302 | 10/1993 | Schmidt et al. | 47/48.5 |

FOREIGN PATENT DOCUMENTS

| | | | |
|---|---|---|---|
| 1069921 | 11/1959 | Germany | 47/48.5 |
| 2642870 | 3/1978 | Germany | 47/48.5 |

*Primary Examiner*—Michael J. Carone
*Assistant Examiner*—Joanne C. Downs

[57] ABSTRACT

A bio-degradable plant root watering system including a sack having a small opening therein leading into a hollow interior thereof. The sack is positionable beneath a root system of a plant in a hole for planting. An elongated tube is included having an open lower end and an open upper end. The open lower end is removably coupled with the small opening of the sack. The open upper end extends upwardly so as to be elevated above the hole. The tube serves to transport water into the sack for watering the root system of the plant.

1 Claim, 1 Drawing Sheet

BIO-DEGRADABLE PLANT ROOT WATERING SYSTEM

BACKGROUND OF THE INVENTION

1. Field of the Invention

The present invention relates to a biodegradable plant root watering system and more particularly pertains to allowing roots of plants to be directly watered and provided with nutrients with a biodegradable plant root watering system.

2. Description of the Prior Art

The use of plant watering systems is known in the prior art. More specifically, plant watering systems heretofore devised and utilized for the purpose of providing mediums for cultivating plants are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,355,622 to Isabelle et al. discloses a plant pouch. U.S. Pat. No. 5,127,187 to Hattori et al. discloses a soil or soil improver containing porous ion exchanger. U.S. Pat. No. 4,299,056 to Towning discloses a self-watering plant growing bag. U.S. Pat. No. 3,962,823 to Zipperer, III discloses a planting bag. U.S. Pat. No. 5,322,586 to Di Mino discloses a paper pouch for flowable food products. U.S. Pat. No. 4,574,522 to Reiger et al. discloses a root control bag.

While these devices fulfill their respective, particular objective and requirements, the aforementioned patents do not describe a bio-degradable plant root watering system for allowing roots of plants to be directly watered and provided with nutrients.

In this respect, the bio-degradable plant root watering system according to the present invention substantially departs from the conventional concepts and designs of the prior art, and in doing so provides an apparatus primarily developed for the purpose of allowing roots of plants to be directly watered and provided with nutrients.

Therefore, it can be appreciated that there exists a continuing need for a new and improved bio-degradable plant root watering system which can be used for allowing roots of plants to be directly watered and provided with nutrients. In this regard, the present invention substantially fulfills this need.

SUMMARY OF THE INVENTION

In the view of the foregoing disadvantages inherent in the known types of plant watering systems now present in the prior art, the present invention provides an improved biodegradable plant root watering system. As such, the general purpose of the present invention, which will be described subsequently in greater detail, is to provide a new and improved bio-degradable plant root watering system and method which has all the advantages of the prior art and none of the disadvantages.

To attain this, the present invention essentially comprises a bio-degradable sack having a generally rectangular configuration. The sack has a small opening therein leading into a hollow interior thereof. The sack is positionable beneath a root system of a plant in a hole for planting. The hollow interior holds plant nutrients therein. The system includes an elongated tube having an open lower end and an open upper end. The open lower end is removably coupled with the small opening of the sack. The open upper end extends upwardly so as to be elevated above the hole. A funnel is coupled with the open upper end of the tube. The funnel is shaped in the form of a flower.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bio-degradable plant root watering system which has all the advantages of the prior art plant watering systems and none of the disadvantages.

It is another object of the present invention to provide a new and improved bio-degradable plant root watering system which may be easily and efficiently manufactured and marketed.

It is a further object of the present invention to provide a new and improved biodegradable plant root watering system which is of durable and reliable construction.

An even further object of the present invention is to provide a new and improved bio-degradable plant root watering system which is susceptible of a low cost of manufacture with regard to both materials and labor, and which accordingly is then susceptible of low prices of sale to the consuming public, thereby making such a bio-degradable plant root watering system economically available to the buying public.

Even still another object of the present invention is to provide a new and improved biodegradable plant root watering system for allowing roots of plants to be directly watered and provided with nutrients.

Lastly, it is an object of the present invention to provide a new and improved biodegradable plant root watering system including a sack having a small opening therein leading into a hollow interior thereof. The sack is positionable beneath a root system of a plant in a hole for planting. An elongated tube is included having an open lower end and an open upper end. The open lower end is removably coupled with the small opening of the sack. The open upper end extends upwardly so as to be elevated above the hole. The tube serves to transport water into the sack for watering the root system of the plant.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
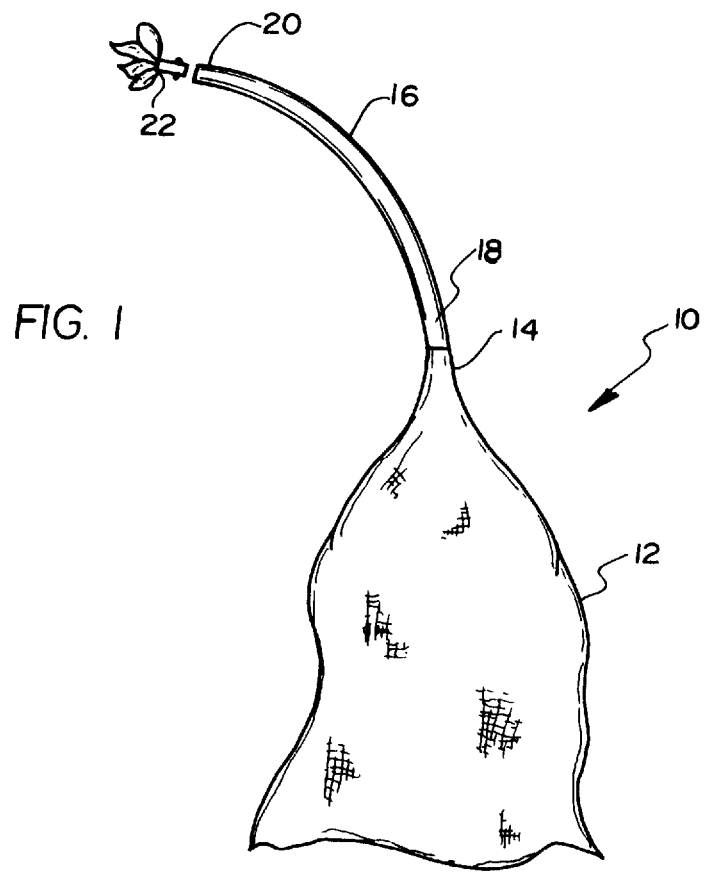
FIG. 1 is a perspective view of the preferred embodiment of the bio-degradable plant root watering system constructed in accordance with the principles of the present invention.
Figure 2:
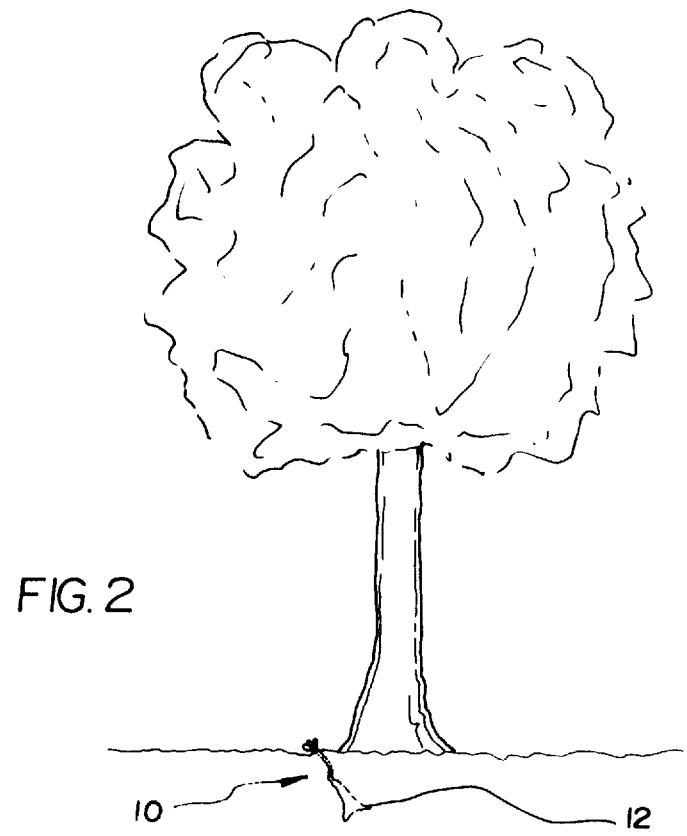
FIG. 2 is a front view of the present invention illustrated in use.

With reference now to the drawings, and in particular, to FIGS. 1 and 2 thereof, the preferred embodiment of the new and improved biodegradable plant root watering system embodying the principles and concepts of the present invention and generally designated by the reference number 10 will be described.

Specifically, it will be noted in the various Figures that the device relates to a bio-degradable plant root watering system for allowing roots of plants to be directly watered and provided with nutrients. In its broadest context, the device consists of a bio-degradable sack, an elongated tube and a funnel. Such components are individually configured and correlated with respect to each other so as to attain the desired objective.

The system 10 includes a biodegradable sack 12 having a generally rectangular configuration. The sack 12 has a small opening 14 therein leading into a hollow interior thereof. The sack 12 is positionable beneath a root system of a plant in a hole for planting. The hollow interior holds plant nutrients therein. In use, a hole is dug is preparation of the in-ground planting of a plant. The sack 12 is placed at the bottom of the hole. The plant is then placed on top of the sack 12 within the hole. Dirt is replaced in the hole.

The system 10 includes an elongated tube 16 having an open lower end 18 and an open upper end 20. The open lower end 18 is removably coupled with the small opening 14 of the sack 12. The open upper end 20 extends upwardly so as to be elevated above the hole. Note FIG. 2. The length of the tube 16 can vary to accommodate various sizes of plants. Ideally, only the open upper end 20 of the tube will be exposed above the hole so as to limit its visibility.

Lastly, a funnel 22 is coupled with the open upper end 20 of the tube 16. The funnel 22 is shaped in the form of a flower. The shape of the funnel 22 in the form of a flower will allow the funnel 22 to be concealed. The funnel 22 allows water to be entered into the tube 16. The tube 16 will transport the water into the hollow interior of the sack 12 where it will dissolve the nutrients to provide the plant with prolonged feeding and a moist environment for longer duration than standard above ground watering.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A biodegradable plant root watering system for allowing roots of plants to be directly watered and provided with nutrients comprising, in combination:

a biodegradable sack having a generally rectangular configuration, the sack having a small opening therein leading into a hollow interior thereof, the sack positionable beneath a root system of a plant in a hole for planting, the hollow interior holding plant nutrients therein;

an elongated tube having an open lower end and an open upper end, the open lower end removably coupled with the small opening of the sack, the open upper end extending upwardly so as to be elevated above the hole; and a funnel coupled with the open upper end of the tube, the funnel being shaped in the form of a flower for allowing the flow of water within the tube.

* * * * *